United States Patent [19]
Roumegoux

[11] Patent Number: 5,131,113
[45] Date of Patent: Jul. 21, 1992

[54] WINDSHIELD WIPER YOKE STRUCTURE WITH SLIDING LEVER

[75] Inventor: Jean-Louis Roumegoux, Paris, France

[73] Assignee: Valeo Systemes D'Essuyage, Montigny-le-Bretonneux, France

[21] Appl. No.: 725,665

[22] Filed: Jul. 3, 1991

[30] Foreign Application Priority Data

Jul. 5, 1990 [FR] France .................. 90 08543

[51] Int. Cl.⁵ ............................................. B60S 1/04
[52] U.S. Cl. ..................... 15/250.42; 15/250.31; 15/250.38
[58] Field of Search .......... 15/250.42, 250.35, 250.39, 15/250.23, 250.21, 280.38, 250.11, 103, 250.31

[56] References Cited

U.S. PATENT DOCUMENTS 3,292,196 12/1966 Windorf ............................ 15/103
3,392,415 7/1968 Shipman ..................... 15/250.38

FOREIGN PATENT DOCUMENTS

| 2515816 | 10/1975 | Fed. Rep. of Germany ... 15/250.38 |
| 1145640 | 3/1956 | France . |
| 2448460 | 10/1980 | France ........................... 15/250.42 |
| 681957 | 10/1952 | United Kingdom ............. 15/250.42 |
| 2120927 | 12/1983 | United Kingdom ............. 15/250.42 |

Primary Examiner—Harvey C. Hornsby
Assistant Examiner—Gary K. Graham
Attorney, Agent, or Firm—Wenderoth, Lind & Ponack

[57] ABSTRACT

A windshield wiper blade includes a wiping strip carried by gripping elements which are themselves part of an articulated support structure for the wiping strip, which is arranged to sweep a glass surface. At least one gripping element is carried by a sliding lever which is biassed outwardly by a spring so that an end portion of the wiping strip is urged towards the swept surface.

12 Claims, 1 Drawing Sheet

WINDSHIELD WIPER YOKE STRUCTURE WITH SLIDING LEVER

FIELD OF THE INVENTION

This invention relates to windshield wiper blades, especially for a motor vehicle having a curved windshield.

BACKGROUND OF THE INVENTION

It is known that for sweeping glass surfaces, especially windshields of motor vehicles, windshield wipers which are driven in a regular oscillating sweeping movement are employed. In general, such a wiper comprises a windshield wiper arm which is moved in an oscillating rotational movement and which is articulated to a wiper blade. Again, such a wiper blade conventionally includes a main carrier element, typically in the form of a yoke, having means for coupling it with the windshield wiper arm. A flexible wiping strip, typically of rubber, is supported by the main carrier element, and the wiping strip engages the swept surface.

With a view to obtaining maximum effectiveness in operation over the entire length of the wiping strip, it is necessary to try to ensure that the wiping strip is applied against the swept surface with a pressure which is an uniform as possible over its length. In known types of windshield wiper blades, a wiping strip is retained by means of a plurality of yokes which are articulated on the main support yoke. Each of these further yokes is so arranged as to enable two attachment points for the wiping strip to be disposed in such a way as to give the best possible distribution of the pressure applied on the swept surface by the wiping strip, in relation to the position of the point at which the relevant yoke is articulated in the support structure of the blade.

The disadvantage of such blades lies in the fact that windshields are curved, in particular towards side edges thereof, so that the distribution of the application force tends to lead to loss of contact between the wiping strip and the swept surface, especially towards the extreme outer end of the blade.

French published patent application No. FR 1 145 640A discloses a wiper blade comprising a main carrier element, at one of the ends of which is articulated a pressure lever. The free end of this pressure lever is engaged in a sliding manner with the outer free end of the wiping strip, and the pressure lever is under the influence of a spring such that it can pivot about the articulation point towards the swept surface, thus enabling the wiping strip to be able to hug the curvature of the swept surface.

Such wiper blades have however been found to have a number of drawbacks. In particular, it has proved necessary to provide a specially designed main carrier element which comprises a number of components for receiving the pressure lever, thus rendering the supporting structure for the wiping strip more complicated and increasing the cost of the blade itself.

In addition, when the pressure lever is subjected to a rotational force around its axis towards the swept surface, the attachment point of the pressure lever on the wiping strip undergoes sliding movement, such that it moves further away from the extreme longitudinal region of the wiping strip. This movement leads to loss of contact in this region between the wiping strip and the swept surface. When the vehicle is in motion and the windshield wiper is parked, this loss of contact sets up vibration at that end of the wiper blade, which is uncomfortable for the occupants of the vehicle and which can also lead to loss of performance of the wiping strip.

SUMMARY OF THE INVENTION

Objects of the present invention are to overcome the above drawbacks, to prrovide a windshield wiper blade which is structure in a manner generally similar to a conventional wiper blade but which has an improved wiping performance, and to ensure that the wiping strip applies and adequate force on the swept surface.

Accordingly, the invention provides a windshield wiper blade, in particular for a motor vehicle, comprising a wiping strip supporting structure having gripping elements which carry a wiping strip for sweeping a glass surface, at least one of the gripping elements being carried by a sliding lever for urging the wiping strip towards the swept surface.

In a wiper blade according to the invention, the point at which the pressure generated by the wiper arm is applied varies in accordance with the curvature of the swept surface, so that the wiper blade will always be in contact with the swept surface over its entire length.

A preferred embodiment of the invention will now be described, by way of example only and with reference to the accompanying drawings, and further features and advantages of the invention will appear more clearly from this description.

DESCRIPTION OF A PREFERRED EMBODIMENT OF THE INVENTION

Figure 1:
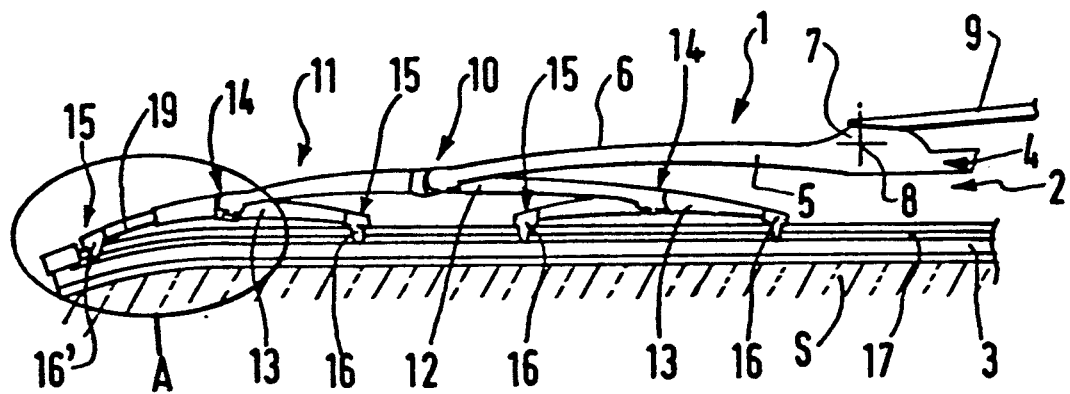
FIG. 1 is a side elevation view showing the general arrangement of part of a windshield wiper blade in accordance with the present invention.

FIG. 1 shows a windshield wiper blade 1 comprising a support structure 2 for carrying a wiping strip 3 for sweeping a glass surface S such as a windshield of a motor vehicle. The support structure 2 comprises a main carrier element or main yoke 4 which is elongated and slightly curved and which has an inverted U-shaped cross section, with flanks 5 which are substantially parallel to each other and perpendicular to a base element 6 of the U.

In the usual way, the base element 6 of the main yoke 4 has in its central part a pair of wing portions 7 which are formed as extensions of the flanks 5. A pivot pin 8 extends through holes (not shown) in the wing portions 7. The holes in the central portion of the main yoke 4 and the pivot pin 8 together enable the support structure 2 to be mounted on a female pivoting element of known type carried by the end of a windshield wiper arm 9.

At least one free end 10 of the main yoke 4 carries an intermediate support linkage 11 comprising at least one intermediate support member which is of a shape substantially identical to that of the main yoke 4, that is to say it is elongated and curved, and has a cross section which is in the form of an inverted U. In the case shown in FIG. 1, the intermediate support linkage 11 comprises a secondary yoke 12 and two auxiliary yokes 13.

The secondary yoke 12 comprises a channel of U-shaped cross section of such dimensions that, at least in its central part, it is retained and received within the U-shaped channel of the main yoke 4, so as to enable the secondary yoke 12 to pivot in the main yoke 4, again in a known manner. The secondary yoke 12 has one auxiliary yoke 13 pivoted to each of its ends 14. The shape of each auxiliary yoke 13 is again elongated and curved, and each auxiliary yoke 13 has at free ends thereof gripping elements 16, 16', respectively, each in the form of a pair of jaws or lugs, for retaining the wiping strip 3. The gripping jaws engage in grooves 17 which are formed along the length of the wiping strip 3, and need not be described in any greater detail herein.

It will of course be understood that, within the scope of the invention, the support structure for the wiping strip may consist only of the main yoke 4, with the gripping elements 16 and 16' being carried by the ends 10 of the latter. Alternatively, it may consist of a main yoke 4 associated with at least one secondary yoke 12, with the gripping elements then being carried by the free ends 14 of the secondary yoke 12.

Figure 2:
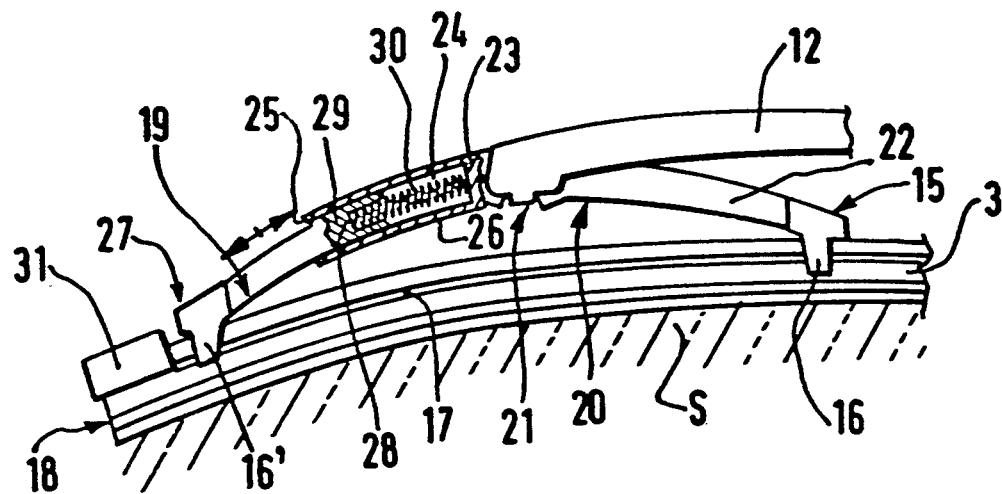
FIG. 2 is a detail view showing, on a larger scale and partly in cross section, the portion A in FIG. 1.

Referring now to FIG. 2, it will be noticed that the pair of gripping jaws 16' which lie nearest to an outer longitudinal free end 18 of the wiping strip 3 are carried by a sliding lever 19 which is supported by a body 20, with the lever 19 and the body 20 constituting the auxiliary yoke 13 which is articulated at 21 on the associated secondary yoke 12. More precisely, the auxiliary yoke body 20, which is elongated and curved, has a first branch 22 constituting about two-thirds of the length of the yoke body 20 and extending from the articulation point 21 in a direction towards the pivot axis 8 of the main yoke 4 (FIG. 1). The gripping element 16 is carried on the free end 15 of the first branch 22, and lies in engagement with the wiping strip 3 by virtue of the bent or curved shape of the first branch 22.

The yoke body 20 has a second branch 23 extending from the articulation point 21 in a direction opposite to the first branch 22. The length of the second branch 23 is in general terms less than that of the first branch 22, and in the present example it is of course about one-third of the total length of the yoke body 20. A longitudinally extending opening or recess 24 is formed in the second branch 23, having an open end 25 and a base 26. The sliding lever 19 is fitted into the opening 24 so as to slide therein. The sliding lever 19 is elongated and curved, with the gripping jaws 16' being carried at its free end 27. At its other end 28, the lever 19 is formed with a portion 29 which is arranged to slide longitudinally in the opening 24 of the branch 23. Preferably, the cooperation between the lever portion 29 and the opening 24 is such that the sliding lever 19 and the yoke body 20 cannot rotate with respect to each other, and to this end both the opening 24 and the sliding portion 29 of the sliding lever 19 may be of complementary quadrilateral cross sections.

As is best seen in FIG. 2, a suitable resilient biassing means, such as a spring 30, is arranged inside the opening 24. One end of the spring 30 bears on the base 26 of the opening 24, while its other end bears on the free end of the sliding portion 29 of the lever 19. The sliding portion 19 has a socket within which fits the corresponding end of the spring 30.

Accordingly, the sliding lever 19 is able to slide towards the swept surface S under the action of the spring 30, thus causing the gripping jaws 16' to slide along the wiper strip grooves 17 towards the free end 18 of the wiping strip, until the jaws 16' come into abutment against a fixed end stop 31 at the free end 18. The end stop 31 generally consists of the usual retaining element by which the rubber wiping strip 3 is fastened on the stiffening element of the windshield wiper blade. Accordingly it need not be described in any greater detail herein.

Thus, where the windshield is sharply curved, in particular at side regions thereof, the spring 30 will exert a force on the sliding lever 19 in such a way that the gripping element 16' is displaced towards the swept surface, thus urging the point of application of the element 16' towards the end of the wiping strip 3, and at the same time urging the latter in the same direction so as to ensure that contact between the wiping strip and the swept surface is maintained.

The present invention is of course not limited to the embodiment described, but embraces all variants within the scope of the invention. In particular, the windshield wiper blade 1 may be arranged without the intermediate support linkage 11. In that case, the gripping element 16 will be carried by the main yoke 4, i.e. at its free end, so that the gripping element 16' can then be carried by a sliding lever in the same way as is described above.

What is claimed is:

1. A windshield wiper blade for sweeping a glass surface, said blade comprising:
   a wiping strip having formed therein longitudinal grooves;
   a supporting structure for carrying said wiping strip and having a plurality of gripping elements for gripping said wiping strip;
   said supporting structure including an elongated support element and a lever mounted for longitudinal sliding movement relative to said support element, one said gripping element being carried by said lever and fitting into said longitudinal grooves in said wiping strip; and
   a member urging said lever in a direction outwardly of said support element such that said one gripping element slides in said longitudinal grooves in said wiping strip and such that said wiping strip is urged toward the surface to be swept.

2. A blade as claimed in claim 1, wherein said support element has curved configuration.

3. A blade as claimed in claim 2, wherein said lever fits within said support element for sliding movement relative thereto and has an elongated and curved configuration corresponding to that of said support element.

4. A blade as claimed in claim 3, wherein said lever has a first end extending into said support element and a second end projecting outwardly from said support element, and said one gripping element is on said second end of said lever.

5. A blade as claimed in claim 4, wherein said support element has a first end having a recess extending thereinto, and said first end of said lever fits slidably into said recess.

6. A blade as claimed in claim 5, wherein said support element has a second end carrying another said gripping element.

7. A blade as claimed in claim 5, wherein said first end of said lever and said recess are configured to prevent rotation between said lever and said support element.

8. A blade as claimed in claim 5, wherein said member comprises a spring acting between said first end of said lever and an internal base surface of said recess in said support element.

9. A blade as claimed in claim 1, wherein said member comprises a resilient element.

10. A blade as claimed in claim 9, wherein said resilient element comprises a spring.

11. A blade as claimed in claim 1, further comprising a fixed stop element mounted on said wiping strip at a position to limit the extent of sliding movement of said one gripping element relative to said wiping strip, and thereby to limit the extent of sliding movement of said lever relative to said support element.

12. A blade as claimed in claim 1, wherein said supporting structure further comprises a main yoke to be carried by a wiper arm, a pair of secondary yokes carried at respective opposite ends of said main yoke, and a pair of auxiliary yokes carried at respective opposite ends of each of said secondary yokes, one of said auxiliary yokes being formed by said support element and said lever.

* * * * *